Figure 8:
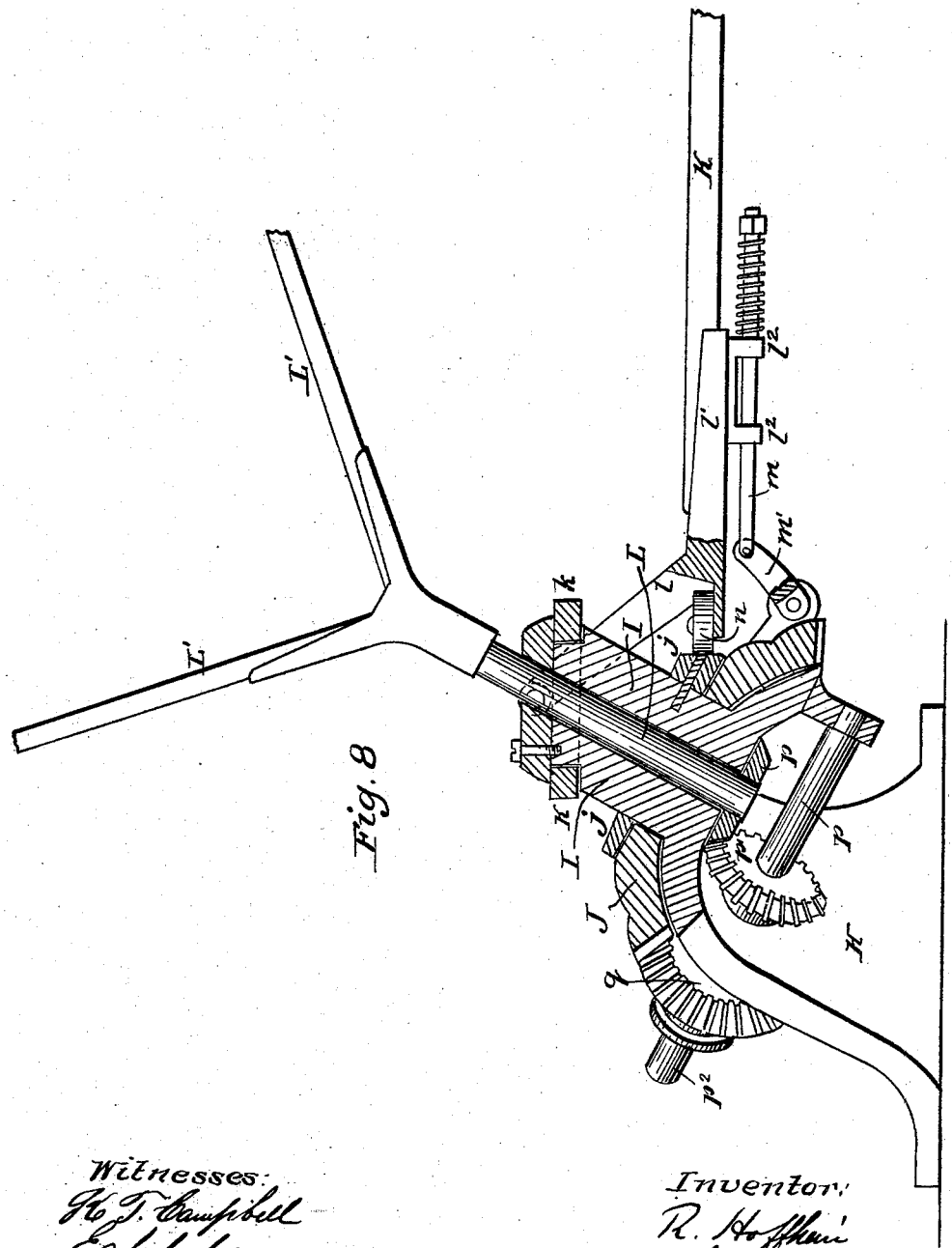

R. HOFFHEIN.
Combined Rake and Reel Attachment to Harvesters.
No. 48,557.
5 Sheets—Sheet 1.
Patented July 4, 1865.
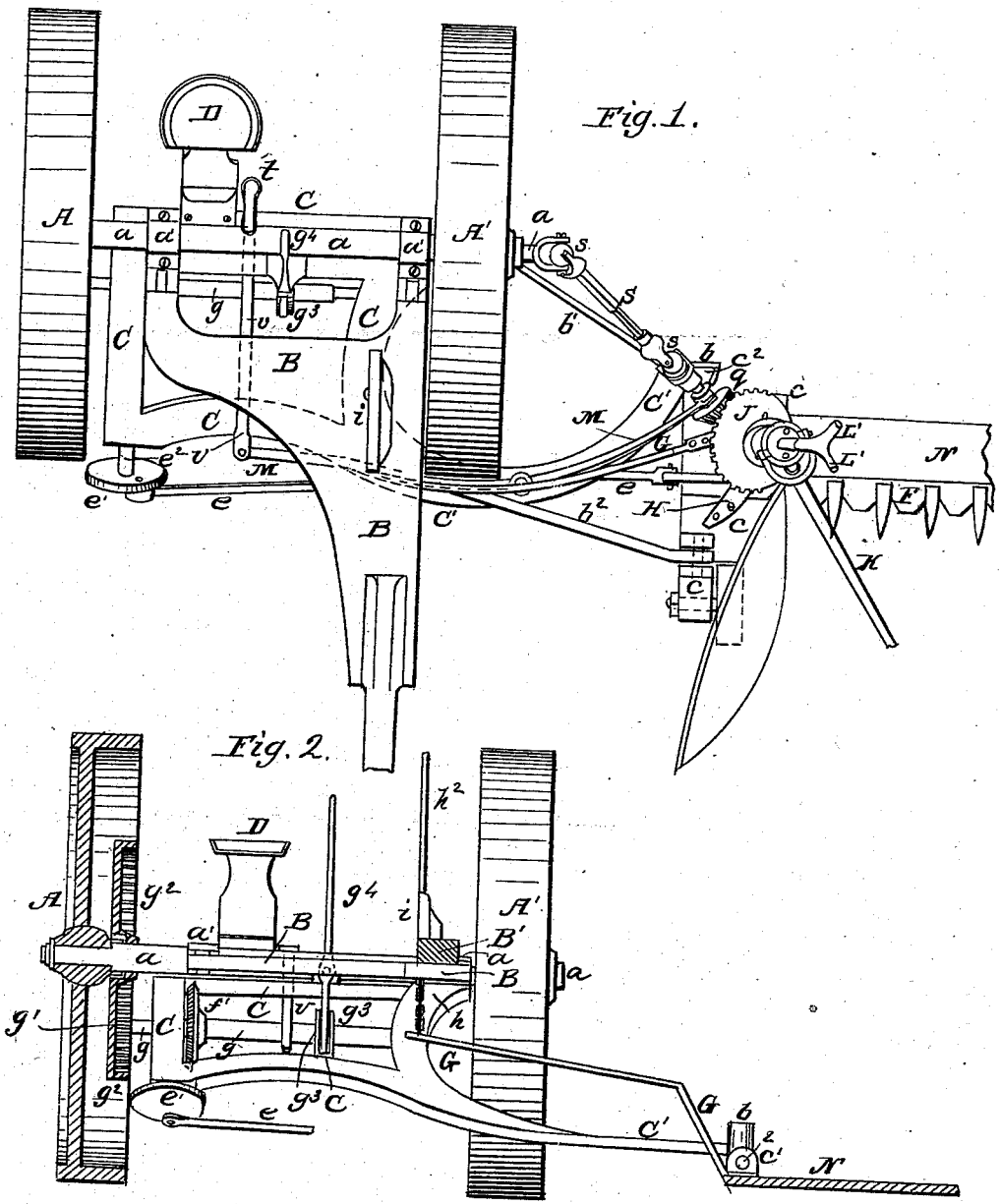

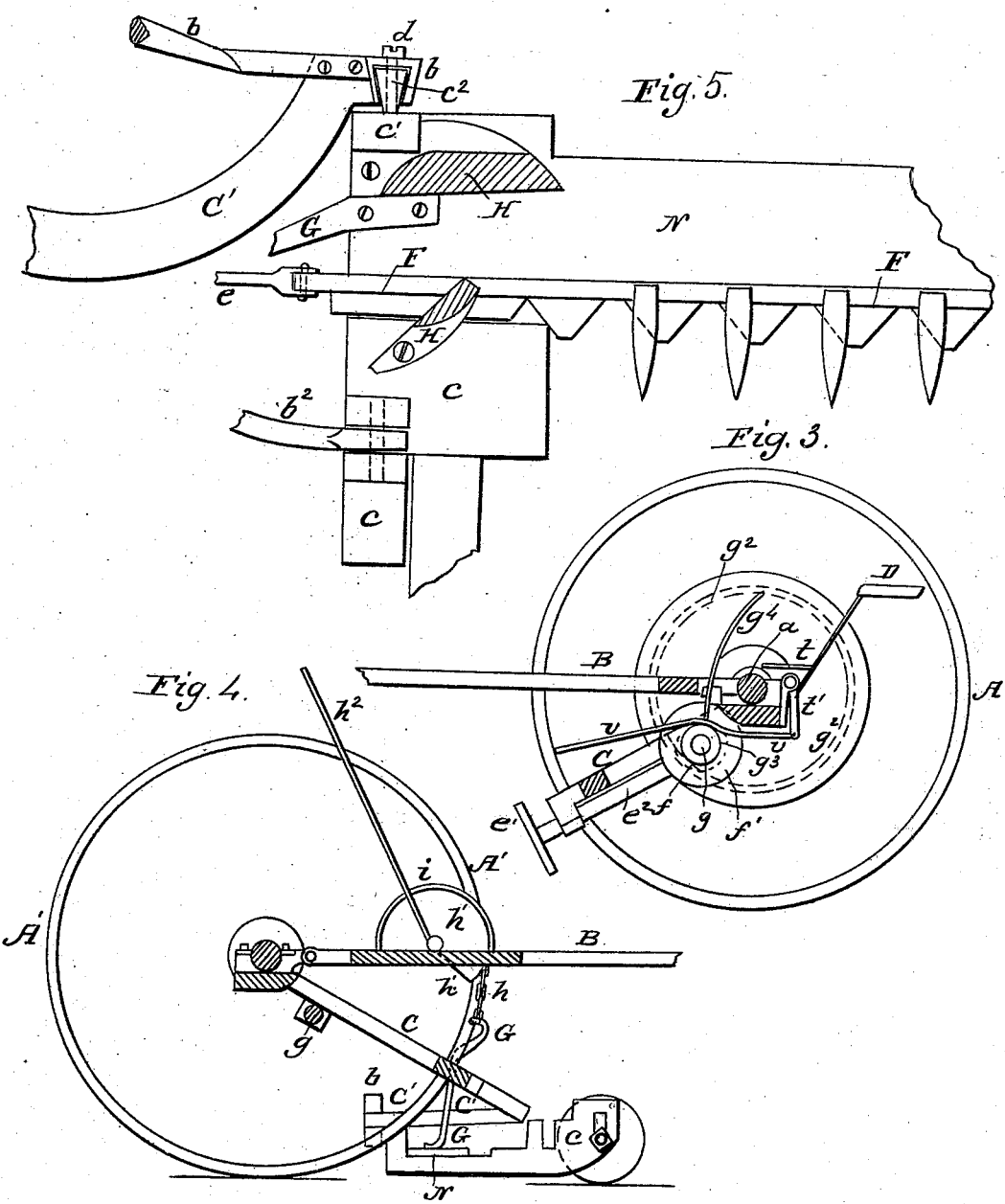

R. HOFFHEIN.
Combined Rake and Reel Attachment to Harvesters.
No. 48,557.
5 Sheets—Sheet 3.
Patented July 4, 1865.
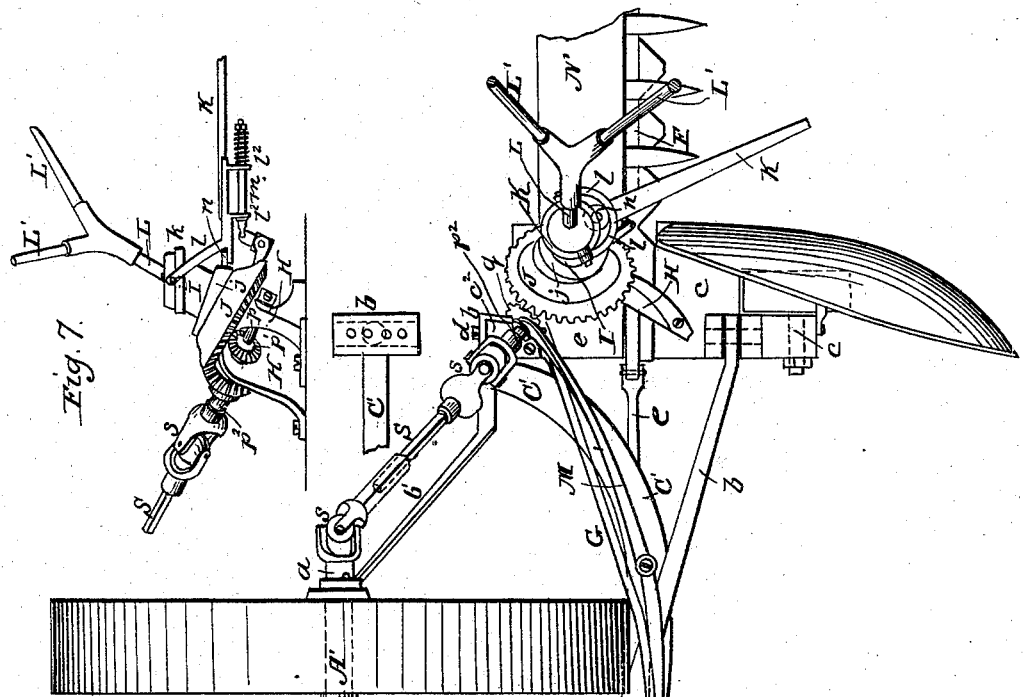

R. HOFFHEIN.
Combined Rake and Reel Attachment to Harvesters.

No. 48,557.

5 Sheets—Sheet 4.

Patented July 4, 1865.

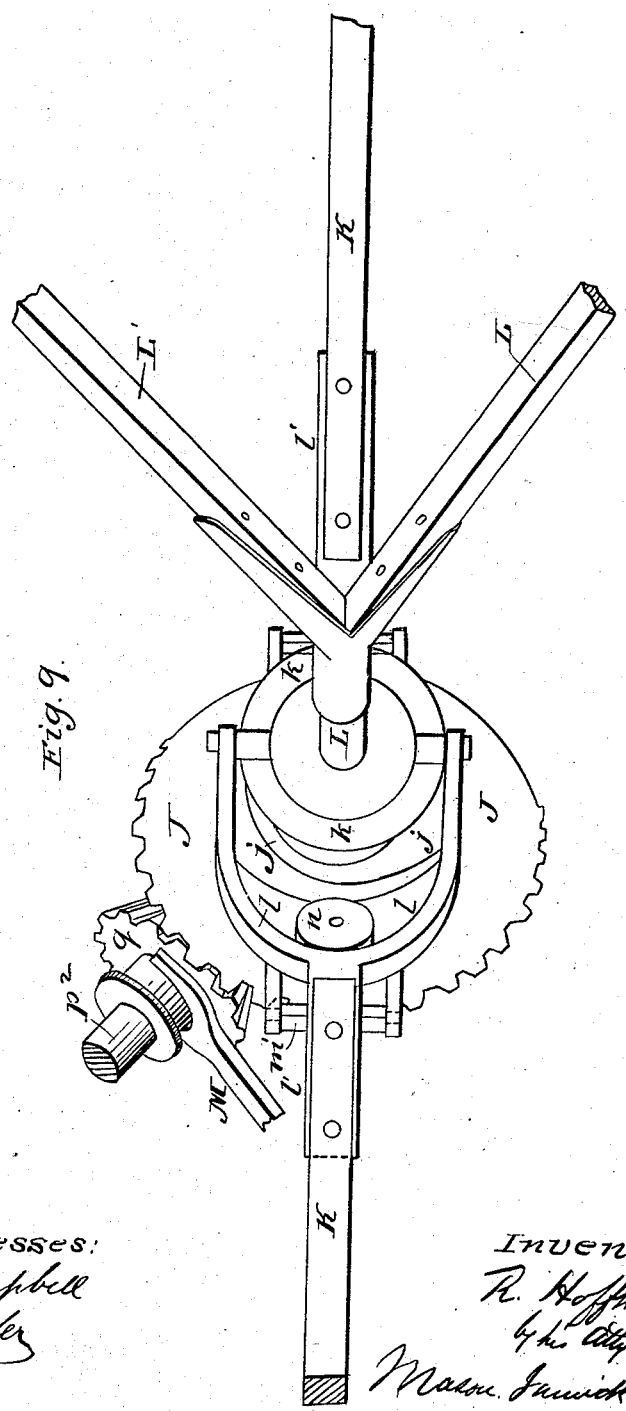

UNITED STATES PATENT OFFICE.

R. HOFFHEINS, OF DOVER, PENNSYLVANIA.

IMPROVEMENT IN COMBINED RAKE AND REEL ATTACHMENT TO HARVESTERS.

Specification forming part of Letters Patent No. 48,557, dated July 4, 1865.

*To all whom it may concern:*

Be it known that I, R. HOFFHEINS, of Dover, county of York, and State of Pennsylvania, have invented certain new and useful Improvements in Reaping and Mowing Machines; and I do hereby declare that the following is a full, clear, and exact description thereof, reference being had to the accompanying drawings, making a part of this specification, in which—

Figure 1, Sheet 1, is a plan view of my machine, having a portion of the sickle and finger-beam broken away. Fig. 2, Sheet 1, is a front elevation of the machine, showing the manner of connecting the finger-beam to the hinged draft-frame. Fig. 3, Sheet 1, is a longitudinal section through the machine, looking from that side carrying the cutting apparatus. Fig. 4, Sheet 1, is a longitudinal section, looking toward the cutting apparatus, and taken between the carriage-wheels. Fig. 5 is an enlarged plan view, showing the mode of connecting the cutting apparatus to the main supporting-frame. Fig. 6, Sheet 2, is an enlarged plan view of the machine, with a portion of the finger-beam broken away. Fig. 7, Sheet 2, is an enlarged front elevation of the mechanism for giving the required movements to the gathering-arms and rake. Fig. 8, Sheet 3, is a vertical section through Fig. 7. Fig. 9, Sheet 3, is a plan view of Figs. 7 and 8, showing the rake-arm in its highest and also its lowest position.

Similar letters of reference indicate corresponding parts in the several figures of the three plates of drawings.

This invention relates to that class of harvesting-machines wherein two carriage-wheels are employed for sustaining the main frame and driver's seat, and wherein the gavels are delivered upon the ground at one side of the cutting apparatus and in rear of the carriage-frame, so as to be out of the way of the machine in its subsequent rounds.

One object of my invention is to provide for the use of an automatic revolving rake and a jointed finger-beam, which latter will rise and fall, and thus accommodate itself to the inequalities of the ground without changing its relative position with respect to the sweep of the rake or the revolving gathering-arms; and, also, to enable the attendant, while riding upon the machine, to stop or start the rake, or to elevate or depress the front part of the cutting apparatus, as will be hereinafter described.

Another object of my invention is to provide for sustaining the cutting apparatus at one side of a two-wheel carriage, by means of a frame which is hinged to the main axle, and which is so constructed and braced that the entire weight upon the said frame will be sustained between the two wheels, in such manner that a very short sweep of the rake will deliver the gavels upon the ground in rear of said carriage, as will be hereinafter described.

By my invention I am enabled to communicate a revolving motion from the main supporting-axle directly to the rake and reel through the medium of a single shaft, which is provided with contrivances for enabling the attendant, while riding upon the machine, to stop the motion of the rake at any desired moment and retain it in the desired position as long as he may desire, as will be hereinafter described.

By my invention I enable the attendant, while riding upon the machine, to control the height of the sickle from the ground, to stop or to start the sickle at pleasure, and to start or stop the revolving rake, as will be hereinafter described. Provision is also made for keeping the rake-arm of a revolving rake down upon the platform, in passing over the same, with an elastic pressure, so that it will properly press upon and accommodate itself to heavy or light swaths, as will be hereinafter described.

To enable others skilled in the art to understand my invention, I will describe its construction and operation.

In the accompanying drawings, A A' represent two large supporting-wheels, which are both applied as an axle, *a*, so that when the machine is moved forward the axle will turn with them, but when the machine is moved backward they will turn loosely around it. For this purpose ratchet-wheels and pawls of a suitable description are employed. One end of the axle *a* extends out a short distance beyond the hub of the wheel which is nearest the cutting apparatus for the purpose of giving motion to the rake and gathering-arms, as will be hereinafter set forth. Two bearings, *a' a'*, are pivoted to the axle *a* at suitable distances apart, and in such manner that they can have no lateral play; and to the forward ends of these bearings $a'$ $a'$ the hounds or frame B, to which the draft-pole B' is attached, is hinged, as shown in the drawings, Plates 1 and 2. The draft-pole B' is arranged as near the wheel A' as possible, for bringing the line of draft as near as practicable to the point of greatest resistance, and thus prevent undue side draft upon the machine. Beneath this hinged pole-frame B, and secured in a suitable manner to the bearings $a'$ $a'$, is the main supporting-frame C, which inclines forward beneath the circumference of the main wheels A A', and is sufficiently depressed at its front end to support the shaft through which motion is transmitted to the sickle, as will be hereinafter described. This frame C has a curved arm, C', formed on that side nearest the inner wheel, A', which arm extends around the front part of this wheel and projects backward and downward a suitable distance, and at its termination a vertical box, $b$, is formed on it, having a dovetail slot cut in it, as shown in Figs. 1, 2, 5, and 6. The frame C being secured to the pivoted bearings $a'$ $a'$, beneath the axle $a$, the rear end of this frame projects a short distance beyond the rear side of said axle, and receives upon it the driver's seat D, which is secured to a post projecting backward, so that the weight of the driver, while sitting in his seat, will assist in counteracting the weight of the forward portion of said frame, and thus enable the driver, with the assistance of a lever properly arranged, to elevate the front part of the cutting apparatus while the machine is in operation.

As it is intended to apply the cutting apparatus to the rear extremity of the curved arm C' of frame C, so that the whole resistance upon the cutting apparatus, in cutting grass or grain, shall be received by the axle $a$, I apply a brace, $b'$, to the rear end of said arm, and connect its rear end in a suitable manner to the outer extension of the axle-tree $a$, as shown in Figs. 1 and 6. Another diagonal brace, $b^2$, I pivot at one end to the front part of the inner shoe, $c$, and secure it at the opposite end to the front part of the frame C. By this arrangement I not only get the entire weight to be sustained by the main wheels A A' between these wheels, but make the axle-tree $a$ resist all the strain brought to operate against the machine in the operation of cutting.

The rear end of the shoe $c$, to which the finger-beam N is secured, has a projection, $c'$, formed on it, and into the rear vertical side of this projection a pin, $c^2$, is rigidly secured, which pin has a conical head that is adapted to fit into and to move up and down in the vertical dovetail slot which is formed in the box $b$ of the arm C. This pin $c^2$ forms a pivot-connection of the cutting apparatus with the main supporting-frame, and also such a connection as will not only allow the outer end of the cutting apparatus to rise and fall upon uneven ground, but which will allow the inner end of said cutting apparatus to rise and fall bodily, the frame C remaining stationary. In a line coinciding with the axis of the pin $c^2$ is the joint of the diagonal brace $b^2$, which sustains the cutting apparatus against backward strain, as before described.

I employ two caster-wheels for sustaining the cutting apparatus upon the ground, one of which is located at the forward end of the shoe $c$, and the other, which is not represented, is located at or near the rear end of the divider. Both of these wheels should be so applied that the cutting apparatus can be set higher or lower, as occasion may require. Provision is also made for adjusting the rear end of the shoe $c$ at any desired height and preventing it from dropping down. At this end a screw bolt or pin, $d$, is inserted into the box $b$, beneath the pin-head $c^2$, and a number of holes can be made, one above the other, into said box to receive the pin $d$, which latter will prevent the rear end of shoe $c$ from falling lower than the desired point.

The sickle F is reciprocated by means of a pitman-rod, $e$, which is pivoted eccentrically to the face of a circular disk, $e'$, that is secured on the forward end of a rotating shaft, $e^2$. This shaft $e^2$ has its bearings on the lower side of the frame C, and on that side nearest the supporting-wheel A, as shown in Figs. 1 and 3, and on the rear end of said shaft is keyed a bevel spur-wheel, $f$, which is driven by a large bevel spur-wheel, $f'$, on a horizontal transverse shaft, $g$. This latter shaft carries on one end a spur-wheel, $g'$, which engages with the teeth of the inside gear-wheel, $g^2$, that is keyed on the main shaft $a$. A collar, $g^3$, is keyed on shaft $g$, and receives in an annular groove formed in it the bifurcated end of a lever, $g^4$, which is pivoted to frame C and extends up to a point which will be convenient for the driver to operate upon it while sitting in the seat D. The shaft $g$ is allowed to have a longitudinal movement in its bearing sufficient to permit the spur-wheel $f'$ to be thrown out of gear with its pinion $f$ by a lateral movement of the lever $g^4$. By such an arrangement the driver can start or stop the sickle while the machine is moved forward.

G represents a bent arm, which is rigidly secured at one end to the inner end of the finger-beam N, and which is attached, by a chain, $h$, at its other end, to an oscillating segment, $h'$, to which a long lever, $h^2$, is applied. This segment is pivoted to a semicircular ratchet-plate, $i$, which is secured rigidly in place on top of the hinged pole-frame B, as shown in Figs. 1, 2, 4, and 6. By this means the weight of the cutting apparatus, when in an elevated position, is sustained upon and by the frame B between the team and the axle $a$. The lever $h^2$ is of sufficient length to enable the driver to operate it while riding upon the machine, and this lever is so constructed that it will be received by the ratchet-teeth in plate $i$, and held in any position in which it may be placed.

H represents a short frame, consisting of two standards and an inclined post, I, as shown in Figs. 7 and 8. This frame is rigidly bolted to the shoe c and finger-beam N, so as to stride the inner end of the sickle F, and permit this sickle to work freely beneath it.

J is a large bevel spur-wheel, which is supported on the top of the enlarged portion of frame H, so as to revolve about the axis of the post I in a plane inclining toward the outer end of the cutting apparatus. Directly above this wheel, and affixed to the post I, is a beveled ring, j, and still further above said wheel is a yoke, k, which is arranged to revolve in a plane parallel to the finger-beam, or nearly so. The yoke k works in an annular groove formed in the post I, as shown in Fig. 8, Sheet 3, and to ears formed on this yoke, diametrically opposite each other, a fork, l, is pivoted, which fork is secured to or formed on the stock $l'$ of the rake-arm K at an obtuse angle thereto. On the lower side of the stock $l'$ eye-bearings $l^2$ are secured, which receive a bar, m, that is acted upon by a spring applied at one end, and held in place by an adjustable nut, as shown in Fig. 8. The opposite end of the spring-bar is pivoted or linked to a rocking loop, $m'$, which is pivoted to eye-bearings secured to the bevel-wheel J. A bearing for a friction-wheel, n, projects from the heel of the rake-arm stock $l'$, and brings said wheel in such position during the sweep of the rake over the platform that it (the wheel) will bear upon the beveled surface of the fixed ring j and prevent the rake-arm from sagging in its passage over the platform. When the bevel spur-wheel J is rotated the rake-arm K will describe the perimeter of a cone, and in passing over the platform this arm moves nearly parallel to it, after which it will rise, so as to pass over the wheel $A'$, and then descend again to make another sweep over the platform.

Through the axis of the inclined post I passes the reel-post L, carrying on its upper end the reel or gathering-arms $L'$, which are secured to said post at, or nearly at, right angles to each other, as shown in Figs. 8 and 9. The lower end of the reel-post L has a bevel spur-wheel, p, keyed to it, which engages with a spur-wheel, $p'$, that is keyed on an inclined shaft, $p^2$, which has its bearings in frame H, as shown in Figs. 7 and 8. This shaft projects from one side of frame H a short distance, and receives upon it a bevel-wheel, q, which has an annular slotted hub formed on it to receive and be embraced by the forked end of a lever, M, which is pivoted to the arm $C'$ of frame C, as shown in Figs. 1 and 6. By means of the lever M the wheel q can be thrown into or out of gear with the large bevel-wheel J, and when thrown into gear with this wheel wheel q is at the same time clutched with the shaft $p^2$. This shaft $p^2$ receives a rotating motion from the axle a of the carriage-wheels A $A'$ through the medium of a shaft, S, which is connected to the axle a and to the short shaft $p^2$ by means of universal joints s s. In practice the shaft S will be made extensible, so as to admit of the vibrations of the cutting apparatus.

The driver can move the wheel q so as to throw it into gear with the wheel J, or out of gear therewith, by means of a foot-rest, t, which is affixed to an upright vibrating lever, $t'$, that is connected by the rod v to the lever M.

The speed of the rake and reel arms can readily be regulated and properly timed by means of spur-wheels of the proper size.

It will be seen from the above description that the reel-arms and rake-arms revolve about a common center, and that the mechanism for giving the required movements to said arms is mounted upon a single frame, H, which is sustained over the shoe c at the inner end of the cutting apparatus.

It will also be seen that the cutting apparatus can rise or fall or move about its joint-connection with frame arm $C'$ without in any manner affecting the perfect working of both reel and rake, and while such is the case provision is made for enabling the driver while in his seat to start or stop the rake at pleasure, and thus regulate the size of the gavels as he may desire.

It will also be seen that by means of the curved arm $C'$ of the frame C, I am enabled to locate the cutting apparatus so far back that a very short platform is required to enable me to deposit the gavels in rear of the driving-wheels A $A'$; consequently a very short sweep of the rake-arm will be required, and less time and power will be expended in delivering the gavels. By thus forming an outer support for the cutting apparatus and extending it back toward the rear part of the carriage I am enabled to employ the rear brace, $b'$, and also to drive the gathering and raking arms by means of a diagonal shaft connected directly to the axle a.

By the contrivance which I have described and shown the rake and reel combined are both supported at the inner side of the platform or inner shoe of the cutting apparatus, and forward of the driving-wheels or axle thereof, and thereby the resistance which they meet with does not occasion as much side draft or lateral strain upon the tongue of the machine as is experienced with other arrangements of rakes and reels.

I have described and shown one practical plan of carrying out my invention, but I do not limit myself to the exact construction and arrangement of the devices shown, as it is obvious that the same may be modified without departing from the principle of operation set forth. For instance, the reel-arms which are represented may be removed with their shaft, and instead of the short shaft shown a long shaft with a bevel-wheel both at its top and bottom may be arranged in its place. The shaft thus provided with a top bevel-wheel might be made to drive a horizontal reel, which is sustained at one or both ends in any of the known ways. With this modification the parts would require to be proportioned relatively, so as to have the rake clear the reel in its movements over the platform, and the rake-axis might be set nearly upright, so as to answer as a support for the inner end of the reel. In all other respects the devices for controlling the motions of the rake, starting and stopping it, and also for operating the reel would be substantially as shown. This modification is not a preferable one, however, as the reel and rake arranged on the one upright or inclined shaft, as represented, are much cheaper and far more effective in their operation than any other arrangement with which I am familiar, for the reason that both the rake and reel (though independent in their revolutions, and the former capable of being stopped without interfering with the continuous revolution of the reel) can be mounted wholly upon the hinged cutting apparatus of harvesters, and thus mounted no change of relation between the platform and the rake and reel arms will be experienced from the rising and falling of the cutting apparatus in its passage over uneven ground. This is not the only change that may be made, but it is unnecessary to mention others here.

Before stating my claims I will mention or allude to the state of the art in this class of invention up to the date of my application for a patent, as follows: A continuously-revolving rake and reel arm or arms all arranged and moving in the same path around an upright or inclined shaft had been contrived. A rake which has its support on the reel-shaft and moves around with the reel during a portion of the reel's revolution, but afterward moves on another axis in the path of a horizontal circle in order to sweep off the grain, had also been contrived. In this case the rake has no independent motion around the axis of the reel-shaft. A rake placed below a reel which is supported at both ends, such rake having a movement entirely around a vertical shaft, and rising and falling on a pivot passed through said shaft, had also been contrived; but with none of these rakes do I find any mechanism applied whereby the rake, when combined with the reel so as to move in concert with it, may be stopped and started by the attendant without stopping the machine or the reel. It must, however, be stated here that the use of a clutch has heretofore been suggested, but in connection with this mere suggestion no mechanical plan of applying the clutch has been shown, and therefore the public are not benefited thereby any more than they would have been if the suggestion had not been made. I have not stopped with a mere suggestion, but have gone further and shown a practical and successful plan for stopping and starting a rake which revolves entirely around an axis, and is independent of the reel in its motions. One important step to the attainment of this result was the hinging of the rake to a coupling which revolves about the axis of motion of the reel-shaft, or the shaft which gives motion to a reel.

Having thus described my invention, what I claim as new, and desire to secure by Letters Patent, is—

1. Constructing a combined rake and reel so that the rake is independent in its revolutions of the reel upon a support which is mounted upon the hinged cutting apparatus of harvesting-machines, substantially as herein described.

2. The construction of the support H for the combined rake and reel, substantially as described.

3. Securing the required motions for the rake by connecting it to a revolving ring or yoke or coupling, and to a revolving wheel, J, which are arranged in different planes and applied to a central shaft or axial support, substantially as described.

4. The manner, substantially as described, of connecting the rake to its driving-wheel J by means of a spring-bar or its equivalent, for the purpose set forth.

5. The arrangement of the four gear-wheels J $q$ $p$ $p'$ with the combined but independently-revolving rake and reel, substantially as herein described.

6. In a rake and reel combined, the rake revolving independently of the reel around the axis of the shaft which carries or drives the reel, providing for stopping and starting the rake without disturbing the reel, and without stopping the machine or harvester, substantially in the manner herein described.

7. The combination of the driver's seat of the harvester, independently-revolving rake, independently-revolving reel, and stopping and starting contrivance of the rake, substantially in the manner and for the purpose described.

8. The combination of the extensible and flexible or jointed shaft S, independent rake, and independent reel, substantially in the manner and for the purpose described.

9. Connecting a rake which turns around the shaft L to opposite sides of a revolving device, $k$, which serves as a hinge on two sides of the shaft L for the rake to play up and down upon, and also as a coupling which permits the rake to revolve independently of the reel, substantially as herein described.

10. The combination of an independently-revolving rake and independently-revolving reel, sliding clutch-wheel $q$, or its equivalent, and the hanging and coupling device $k$, or its equivalent, substantially as and for the purpose herein described.

11. A rake which revolves or turns independently of the reel around the shaft L, which drives or carries the reel during its entire circuit, substantially as and for the purpose described.

12. The arrangement, with an independently-revolving rake and an independently-revolving reel, of a contrivance for stopping and starting the rake without stopping the reel, substantially as described.

13. Constructing a combined rake and reel in such a manner that the rake and reel have independent motions of one another, although the rake moves around the shaft which carries or drives the reel, substantially as described.

14. An independent revolving reel mounted upon a hinged cutting apparatus of a harvester, in combination with a revolving rake, substantially as described.

15. The arrangement, in a harvester, of the independent reel, independent rake, hinged cutting apparatus, and stopping and starting contrivance, substantially as described.

16. An independent reel and an independent rake combined, both moving in a similar direction, but in different paths, about a common axis or shaft, substantially as herein described.

17. The combination of an independent revolving rake, which is sustained at only one end, with an independent revolving reel or gatherer, which is also only sustained at one end in such manner that the rake always maintains a position below the reel, substantially as described.

18. The combination, with a harvesting-machine constructed with two driving-wheels, a jointed cutting apparatus, an independently-revolving rake, and an independently-revolving reel, the reel and rake being mounted on the cutting apparatus, of an adjusting contrivance which is so arranged that the driver, while riding on the machine, can adjust the cutting apparatus and the rake and reel without stopping the machine, substantially as described.

19. The combination of a hinged curved frame, hinged cutting apparatus, independent revolving rake, and independent revolving reel, substantially as described.

20. The arrangement of the independently-revolving rake and independently-revolving reel upon a jointed cutting apparatus at a point forward of the axle $a$ and to one side of the drive-wheel A', substantially as and for the purpose described.

21. The arrangement, in a two-wheeled harvesting-machine, of a hinged supporting-frame, C, a jointed cutting apparatus, a revolving reel or gatherer, and a rake with attachments or connections, by which the attendant of the machine, while riding thereon, can control its motions, substantially as herein described.

22. Combining a rake and a reel or gatherer in such manner that the former revolves around the axis of the latter and also independently of it, and can be stopped and started at the will of the operator while he is riding upon the machine, substantially as described.

REUBEN HOFFHEINS.

Witnesses:
GEORGE M. SHETTER,
A. W. SHETTER.